United States Patent
Hsu et al.

(10) Patent No.: US 7,813,064 B2
(45) Date of Patent: Oct. 12, 2010

(54) COLOR WHEEL ASSEMBLY AND COLOR WHEEL WITH SAME

(75) Inventors: Pi-Tsung Hsu, Taipei Hsien (TW); Chih-Wei Tso, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 288 days.

(21) Appl. No.: 11/935,664

(22) Filed: Nov. 6, 2007

(65) Prior Publication Data

US 2008/0297933 A1   Dec. 4, 2008

(30) Foreign Application Priority Data

May 30, 2007   (CN) .................... 2007 1 0200722

(51) Int. Cl.
*G02B 5/22* (2006.01)
*G02B 7/00* (2006.01)
*H04N 9/12* (2006.01)
*G01N 21/25* (2006.01)
*G03B 21/14* (2006.01)

(52) U.S. Cl. .................. 359/892; 359/891; 348/743; 356/418; 353/84

(58) Field of Classification Search .......... 359/892
See application file for complete search history.

(56) References Cited

U.S. PATENT DOCUMENTS

| 4,076,393 A * | 2/1978 | Bates .................... 359/892 |
| 5,868,482 A | 2/1999 | Edlinger et al. |
| 2006/0227441 A1* | 10/2006 | Hsu et al. .................... 359/892 |

FOREIGN PATENT DOCUMENTS

| CN | 1690837 A | 11/2005 |
| CN | 1873519 A | 12/2006 |

* cited by examiner

*Primary Examiner*—Stephone B Allen
*Assistant Examiner*—Jade R Chwasz
(74) *Attorney, Agent, or Firm*—Jeffrey T. Knapp

(57) ABSTRACT

A carrier, a locking member, a color filter unit and an elastic member are provided. The carrier includes a main body, a shaft and a lock-receiving portion. The shaft coaxially protrudes outwardly from the main body. The lock-receiving portion is defined in the shaft. The locking member is lockingly received in the lock-receiving portion. The color filter unit is disposed on the main body. The elastic member is interposed between the locking member and the color filter unit and is compressed therebetween to push the color filter unit against the main body. In this way, the color filter unit is firmly fixed on the main body and the color wheel assembly is assembled.

12 Claims, 5 Drawing Sheets

COLOR WHEEL ASSEMBLY AND COLOR WHEEL WITH SAME

BACKGROUND

1. Technical Field

The present invention relates to color wheels, and particularly to a color wheel assembly and an assembled color wheel for use in projection technology.

2. Description of Related Art

Color composition in digital light processing (DLP) projectors can be accomplished, for example, by two different methods: single-panel and triple-panel (three-panel). In the single-panel, each projector is equipped with one digital micro-mirror device (DMD); white light from a light source is dispersed into red (R), green (G) and blue (B) light, in sequence; the DMD switches between the R, G and B lights to produce R, G and B images, in sequence; and a color composition of the R, G and B images is formed by viewers due to an afterimage effect. In the triple-panel, three DMDs respectively dedicated to R, G and B lights are employed in one projector; R, G and B images are produced in parallel; and a color composition is accomplished by projecting the R, G and B images at/onto a screen.

Projectors with a single DMD tend to be small in size and low in price. Thus, these projectors are very popular. In these projectors, a color wheel is preferably used as a sequential dispersing device to disperse white light into R, G and B light.

Referring to FIG. 5, a color wheel 99 includes a motor 98, a carrier 97, a color filter unit 96, a vibration damping ring 95, a cover 94, a spring 93, two spacers 92 and a locking member 91. The motor 98 includes a rotating housing 981, a shaft 982 and a lock-receiving portion 983. The rotating shaft 982 is coaxially fixed to the rotating housing 981, along a rotating axis of the rotating housing. The lock-receiving portion 983 is defined in the shaft 982, near a distal end thereof. The carrier 97, the color filter unit 96, the vibration damping ring 95, the cover 94, the spring 93 and the spacers 92 are inserted through the rotating shaft 982, and are arranged in this order from a near-end of the rotating housing 981 to a far-end of the rotating housing 981. The locking member 91 is locked in the lock-receiving portion 983 and thereby compresses the spring 93. The compressed spring 93 applies a constant force that pushes against the assembly of the cover 94, the vibration damping ring 95, the color filter unit 96, and the carrier 97 so as to be firmly fixed on the motor 98. In this configuration the color wheel 99 is a complex design because the motor 98 must be structurally matched with the carrier 97, the color filter unit 96, the spring 93 and the locking member 91. Additionally, the motor 98 needs to undergo multiple operations to assemble the carrier 97, the color filter unit 96, the cover 94, the spring 93 and the locking member 91 thereon in an assembling process. The complicated structure and manufacture processes thereof, and the large number of operations may damage a rotational symmetric property of the motor, and readily result in an eccentric motor. Accordingly, the efficiency of motor may be decreased and noise generated by the working motor may be increased, since the motor will be driven to rotate with eccentric force.

Therefore, it is desirable to provide a color wheel assembly and a color wheel with the same, which can overcome the above-mentioned problems.

SUMMARY

In a present embodiment, a color wheel assembly comprises a carrier, a locking member, a color filter unit, and an elastic member. The carrier includes a disk-shaped main body, a shaft, and a lock-receiving portion. The shaft coaxially protrudes outwardly from the main body. The lock-receiving portion is defined in the shaft. The locking member is lockingly received in the lock-receiving portion. The color filter unit is disposed on the main body. The elastic member is interposed between the locking member and the color filter unit and is compressed therebetween to push the color filter unit against the main body. In this way, the color filter unit is firmly fixed on the main body and the color wheel assembly is assembled.

BRIEF DESCRIPTION OF THE DRAWINGS

Many aspects of the present color wheel assembly and the color wheel should be better understood with reference to the following drawings. The components in the drawings are not necessarily drawn to scale, the emphasis instead being placed upon clearly illustrating the principles of the present color wheel assembly and the color wheel. Moreover, in the drawings, like reference numerals designate corresponding parts throughout the several views.

DETAILED DESCRIPTION OF THE EMBODIMENTS

Embodiments of the present color wheel assembly and the color wheel will be now described in detail with reference to the drawings.

Figure 1:
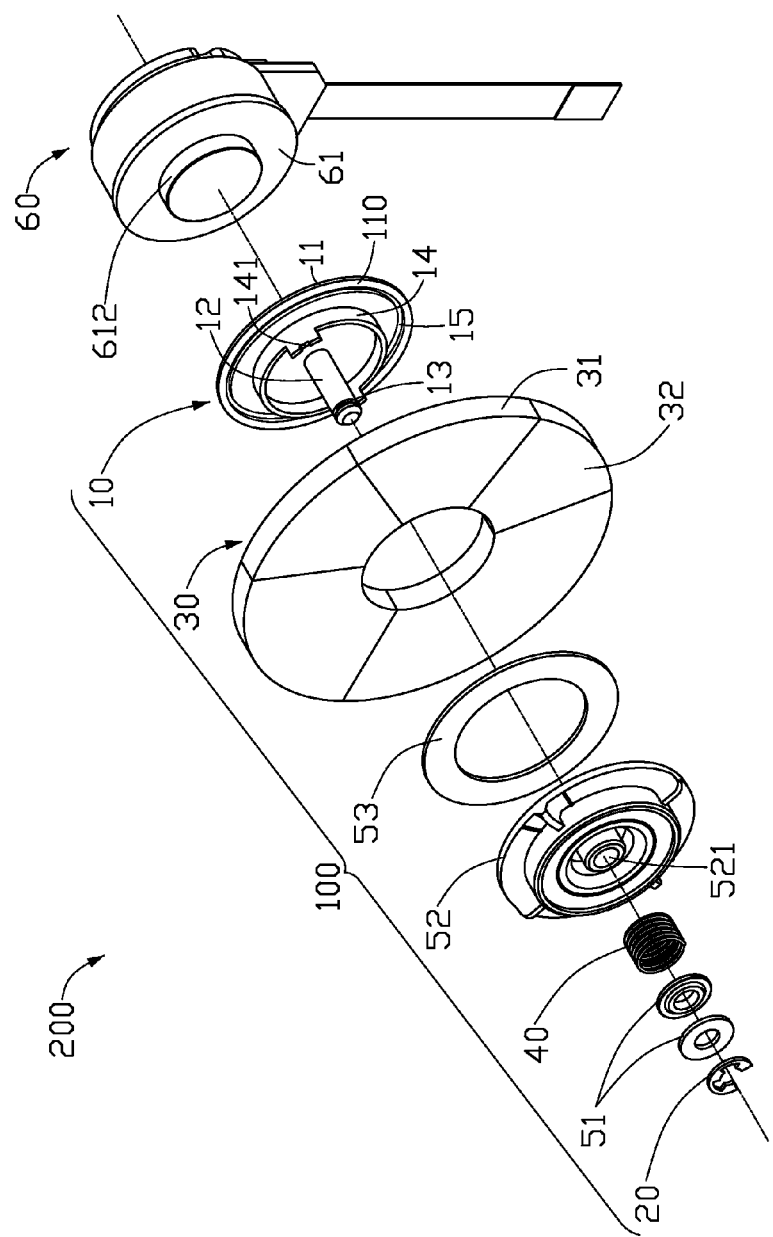
FIG. 1 is an isometric, exploded view of a color wheel, according to an embodiment.
Figure 3:
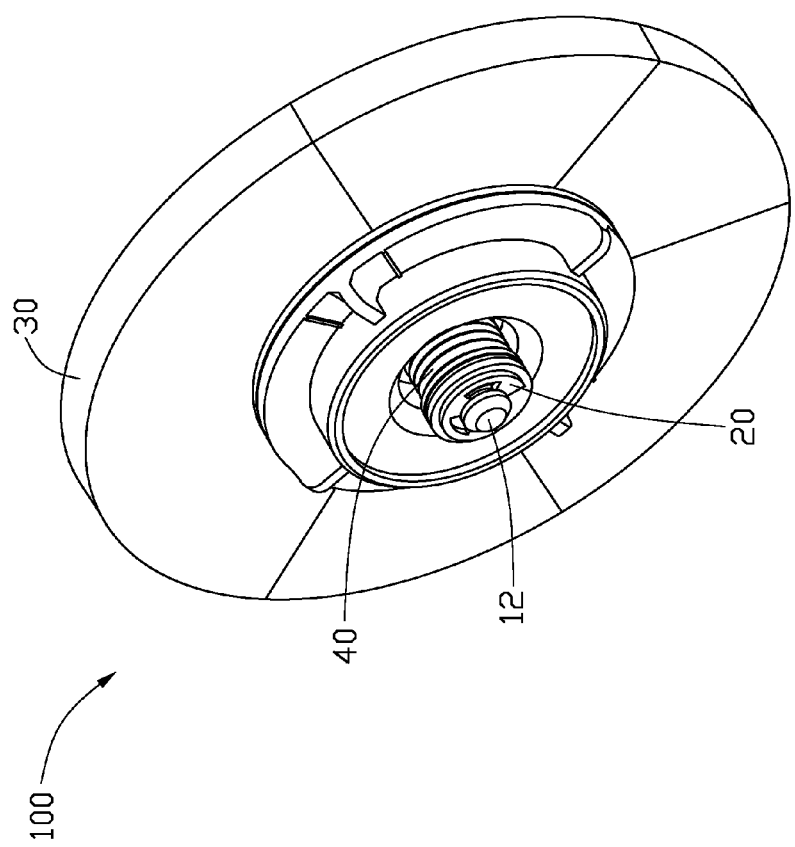
FIG. 3 is an isometric, assembled view of the color wheel, according to the embodiment.

Referring to FIG. 1, a color wheel assembly 100, according to a present embodiment, includes a carrier 10, a locking member 20, a color filter unit 30 and an elastic member 40. The carrier 10 includes a disk-shaped main body 11, a shaft 12 and a lock-receiving portion 13. The main body 11 includes a supporting surface 110 configured for supporting the color filter unit 30. The shaft 12 coaxially protrudes outwardly from the main body 11. In particular, the shaft 12 perpendicularly protrudes outwardly from a central portion of the supporting surface 110, thus the main body 11 and the shaft 12 are coaxially arranged and can be driven to rotate about the shaft 12. The lock-receiving portion 13 is defined in the shaft 12, near a distal thereof. The locking member 20 is accommodated and locked in the lock-receiving portion 13. The disk-shaped color filter unit 30 is inserted through the shaft 12. The elastic member 40 surrounds the shaft 12 and is interposed between the locking member 20 and the color filter unit 30. The elastic member 40 thus configured is compressed therebetween and consequently pushes the color filter unit 30 against the main body 11 (see FIG. 3). In this way, the color filter unit 30 is firmly disposed on the main body 11 (i.e., the supporting surface 110).

The main body 11 and the shaft 12 thus configured (i.e., axial symmetrically structured and coaxially arranged) are rotational symmetric with respect to the shaft 12 and can be driven to rotate about the shaft 12 without eccentric effort.

Figure 4:
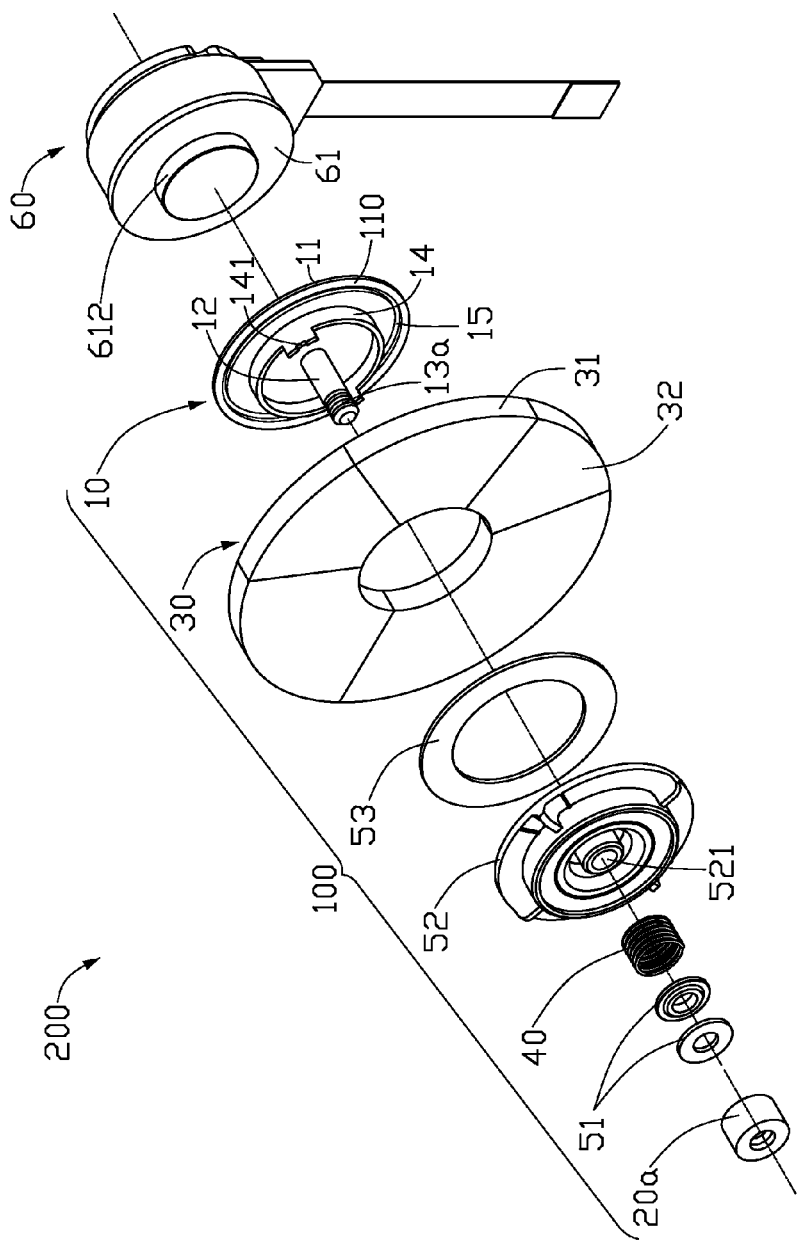
FIG. 4 is an isometric, exploded view of another color wheel according to another embodiment.
Figure 5:
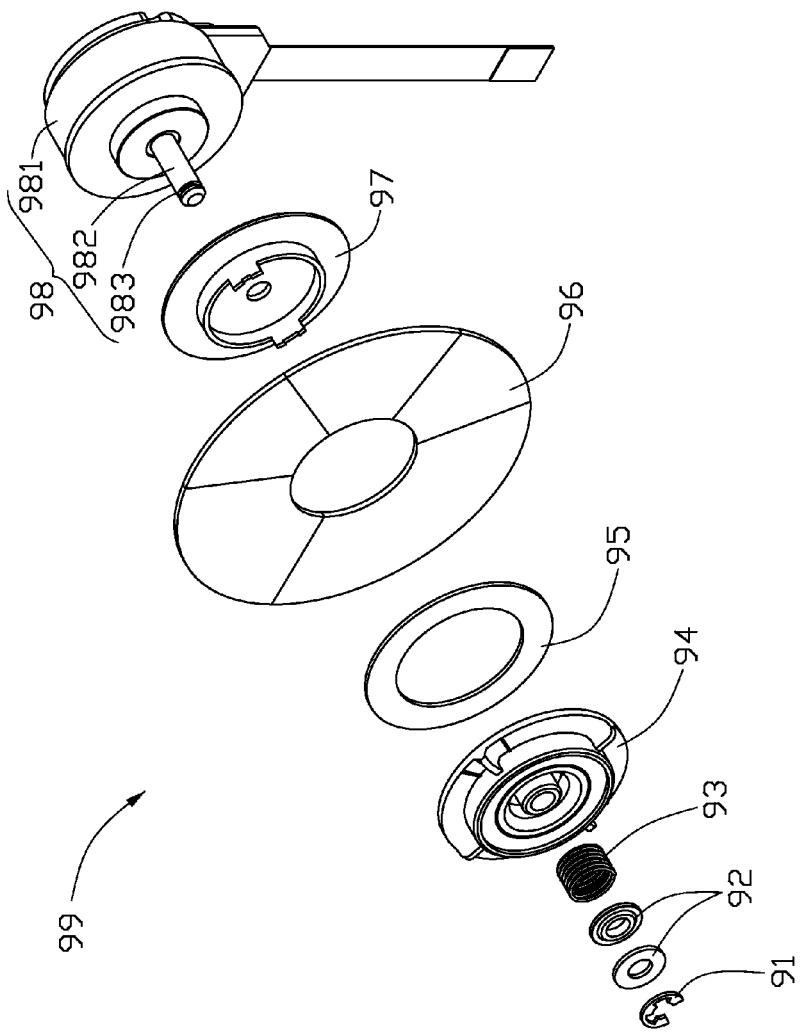
FIG. 5 is an isometric, exploded view of a color wheel, according to a related art.

The locking-receiving portion 13 is a receiving groove. Accordingly, the locking member 20 is a retaining ring configured (i.e., structured and arranged) for fitting into a groove shape of lock-receiving portion 13. The retaining ring can be, for example, a C-shaped ring, an E-shaped ring, or a U-shaped ring, etc., depending on a corresponding shape of the receiving groove. Alternatively, other lockable/unlockable structures could be employed as the lock-receiving portion and the locking member. For example, the lock-receiving portion can be a threaded section 13a defined in the shaft 12 and, accordingly, the locking member can be a nut 20a for coupling with the threaded section 13a (see FIG. 4).

A distance between the main body 11 and the lock-receiving portion 13 is shorter than a natural (uncompressed) length of the elastic member 40. Thus, upon assembly, the elastic member 40 must consequently be compressed between the color filter unit 30 and the locking member 20. Namely, the elastic member 40 must be compressed to be loaded unto the shaft 13, thus providing a constant elastic force against both the color filter unit 30 and the locking member 20. The elastic member 40 is a spring (e.g., a coil spring) capable of fittingly surrounding the shaft 12 (e.g., slidable therealong), but it could alternatively take the form of, e.g., an elastomeric sleeve. Specifically, two spacers 51 are employed between the elastic member 40 and the locking member 20 and are configured for structurally coupling the elastic member and the locking member 20.

The color filter unit 30 includes a disk-shaped transparent substrate 31. A surface of the transparent substrate 31 is divided into a plurality of pie-shaped areas 32. The pie-shaped areas 32 are coated with different colored light filter films (not shown), each respectively dedicated to exclusively transmitting a different color light. It is to be noted that the color filter unit 30 could alternatively take the form of: e.g., a plurality of pie-slice-shaped color fitters annularly arranged, each color filter is configured for exclusively transmitting a different color light. Preferably, the annular transparent substrate 31 or the annularly arranged color filters is/are attached to the supporting surface 110 using hot-curable adhesive or adhesive tape (not shown).

In this illustrated embodiment, the color filter unit 30 has an inner diameter larger than a diameter of the shaft 12. The carrier 10 further includes a positioning portion 14 coaxially protruding outwardly from the main body 11 (i.e., the supporting surface 110). The positioning portion 14 is matingly/fittingly sized so as to coaxially and firmly position the color filter unit 30 on the main body 11. In this way, the color filter unit 30 will be driven to rotate by the positioning portion 14 instead of the shaft 12. Thus torque applied to the color filter unit 30, by the positioning portion 14, is increased, with respect to the torque applied by the shaft 12. Hence, the efficiency of a color wheel 200 employing the color wheel assembly 100 increases.

On the other hand, the inner diameter of the color filter unit 30 is also larger than an outer diameter of the elastic member 40 fittingly surrounding the shaft 12. A structural mismatch between the color filter unit 30 and the elastic member 40 is resulted. Accordingly, a ring-shaped cover 52 is employed between the color filter unit 30 and the elastic member 40 to improve a structural matchability therebetween. The ring-shaped cover 52 defines a central hole 521 fitting into the shaft 12 and has an outer diameter larger than the inner diameter of color filter unit 30. It should be understood that the cover 52 also enlarges a contact surface between the color filter unit 30 and the elastic member 40 and shields the hot-curable adhesive/adhesive tape between the color filter unit 30 and the supporting surface 110 from being impinged on by light from a light source (not shown). Specifically, a height of the positioning portion 14 is less than a thickness of the color filter unit 30. Thus, the constant elastic force generated by the elastic member 40 can be applied on the color filter unit 30 instead on the positioning portion 14. Preferably, the cover 52 further includes at least one rib 522 (see FIG. 4) formed opposing/facing the positioning portion 14, the position portion 14 defines at least one rib-receiving portion 141 therein, respectively cooperating with the at least one rib 522. Thus, the cover 52 is prevented from rotating relative to the carrier 10 when both of them are driven to rotate.

Preferably, the color wheel assembly 100 further includes a vibration damping ring 53 interposed between the cover 52 and the color filter unit 30. The vibration damping ring 53 is configured for absorbing vibration generated by a rotation of the color filter unit 30 and is made of vibration damping material, such as rubber, silicon glue or plastic. Alternatively, the vibration damping ring 53 also can be interposed between the color filter unit 30 and the main body 11.

More preferably, in order to improve a rotational balance of the color wheel assembly 100 when it being driven to rotate, a balancing groove 15 is defined in the carrier 10 (e.g., the supporting surface 110).

It should be understood that all the spacers 51, the cover 52 and the vibration damping ring 53 are, preferably, axial symmetric in shape and coaxially arranged with the main body 11, thus, the color wheel assembly 100 can be driven to rotate about the shaft 12 without eccentric effect.

Figure 2:
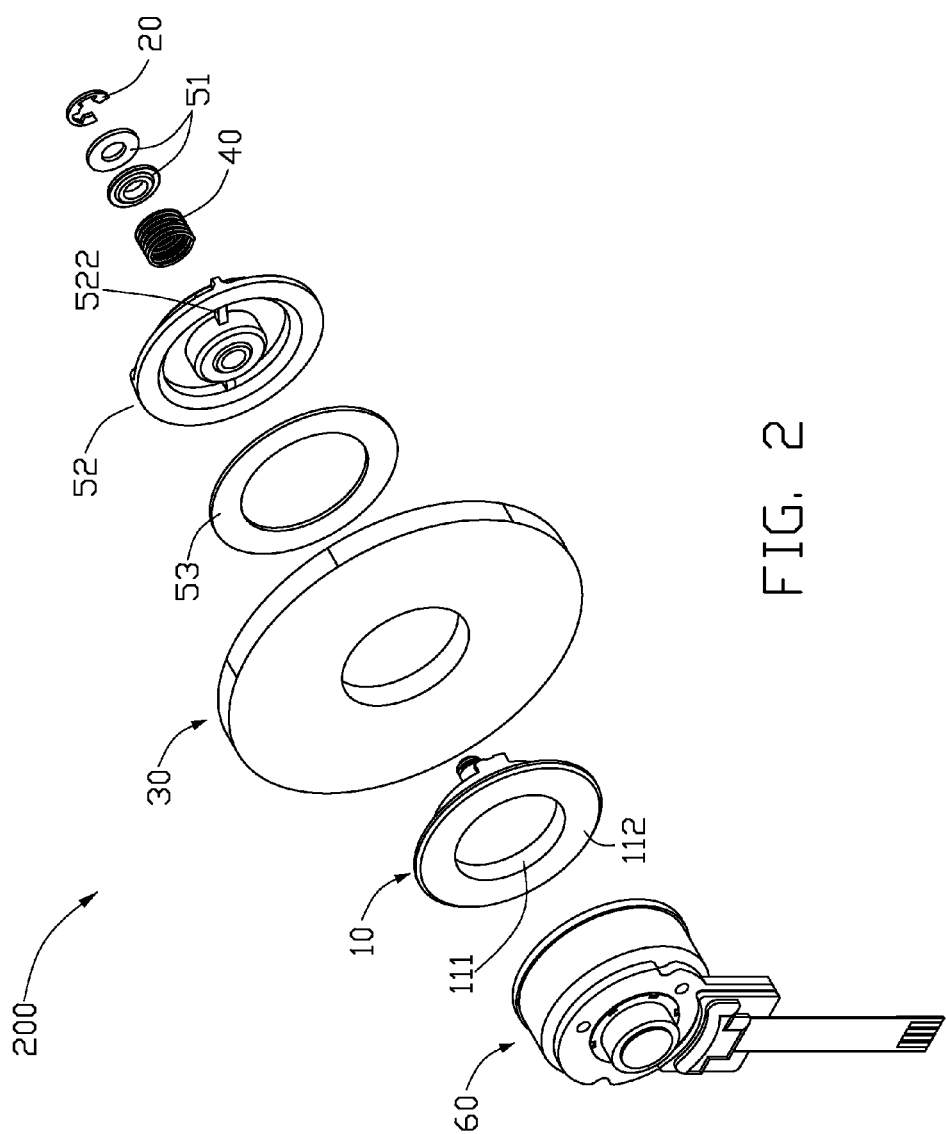
FIG. 2 is an isometric, exploded view of the color wheel of FIG. 1 in another angle.

The color wheel 200 of this embodiment includes a motor 60 and the color wheel assembly 100. The motor 60 includes a rotor portion 61, e.g., rotating housing, the rotor portion can be driven to rotate about a rotating axis. The main body 11 is coaxially disposed on the rotator portion 61. Namely, the shaft 12 extends along the rotating axis. Thus, the color wheel assembly 100 can be driven to rotate about the shaft 12 by the motor 60. In this illustrated embodiment, the rotor portion 61 comprises a hub 612. The main body 11 defines a hub-receiving portion 111 in a central portion of a fixing surface 112 (i.e., surface on the other side of the supporting surface 110, see FIG. 2) thereof. The hub-receiving portion 111 is sized so as to fit into the hub 612 and is thereby coaxially positioned, cooperating with the hub 612, the main body 11 on the rotor portion 61.

The motor 60 is configured for driving the color wheel assembly 100 to rotate. In addition to the rotor portion 61, e.g., rotating housing, the motor 60 further employs electromagnetic members (not shown) in the rotor portion 61, e.g., rotating housing, for driving the rotor portion 61 to rotate. Preferably, the rotor portion 61 is axial symmetric in shape, e.g., barrel-shaped, with respect to the rotating axis and can be driven to rotate without eccentric effort.

The color wheel 200 is made with a complex design (e.g., the shaft, the lock-receiving portion and the balancing groove) to the color wheel assembly 100 (i.e., the carrier 10) instead to the motor 60. Thus, the motor 60 can be simply designed (e.g., structured). Further, the color wheel assembly 100 can be pre-assembled before being fixed to the motor 60, avoiding too many assembling operations. In this way, an excellent work performance of the motor 60 can be assured after the color wheel 200 is assembled.

It is to be understood that elements from the embodiments, to the degree practical, could potentially be combined and/or interchanged. Further, where a mating and/or fitting match between parts is prescribed, it is to be understood that such a fit should permit sliding therebetween to allow reasonably easy assembly/disassembly yet should be tight enough to otherwise minimize any potential lateral movement/vibration therebetween.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A color wheel assembly comprising:
   a carrier comprising:
   a disk-shaped main body;
   a shaft coaxially protruding outwardly from the main body;
   a lock-receiving portion defined in the circumferential surface of the shaft, adjacent to the distal end thereof;
   a locking member lockingly received in the lock-receiving portion;
   a color filter unit disposed on the main body, wherein the color filter unit is annular in shape and has an inner diameter greatly larger than a diameter of the shaft; an annular positioning portion coaxially protruding outwardly from the main body, the positioning portion being configured for firmly positioning the color filter unit on the main body and driving the color filter to rotate, a height of the positioning portion is less than a thickness of the color filter unit;
   a coil spring sleeved on the shaft and interposed between the locking member and the color filter unit, the coil spring thereby being adapted to push the color filter unit against the main body; and
   a ring-shaped cover interposed between the color filter unit and the coil spring for structurally coupling the color filter unit and the coil spring, the cover ring-shaped cover comprising at least one rib formed facing the positioning portion, the positioning portion defining at least one rib-receiving portion therein, respectively cooperating with the at least one rib, to prevent the ring-shaped cover from rotating relative to the carrier.

2. The color wheel assembly as claimed in the claim 1, wherein the main body comprises a supporting surface configured for supporting the color filter unit, the shaft perpendicularly protruding outwardly from a central portion of the supporting surface.

3. The color wheel assembly as claimed in the claim 1, wherein the main body is axially symmetric in shape.

4. The color wheel assembly as claimed in the claim 1, wherein the lock-receiving portion is a receiving groove defined in the shaft, the locking member is a retaining ring matingly receivable in the receiving groove.

5. The color wheel assembly as claimed in the claim 1, wherein the lock-receiving portion is a thread section defined in the shaft, the locking member is a nut coupling with the thread section.

6. The color wheel assembly as claimed in the claim 1, wherein a distance between the main body and the lock-receiving portion is shorter than a natural length of the coil spring.

7. The color wheel assembly as claimed in the claim 1, wherein the color filter unit comprises an annular transparent substrate, a surface of the transparent substrate being divided into a plurality of pie-shaped areas being respectively coated with a different light filter film, each respective light filter film being dedicated for exclusively transmitting a different color light.

8. The color wheel assembly as claimed in the claim 1, wherein the color filter unit comprises a plurality of pie-slice-shaped color filters annularly arranged, each respective color filter being dedicated for exclusively transmitting a different color light.

9. The color wheel assembly as claimed in the claim 1, further comprising a ring-shaped cover interposed between the color filter unit and the coil spring for structurally coupling the color filter unit and the coil spring.

10. The color wheel assembly as claimed in the claim 1, further comprising a vibration damping ring attached to the color filter unit for absorbing vibration generated by a rotation of the color filter unit.

11. The color wheel assembly as claimed in the claim 10, wherein the vibration damping ring is made of vibration damping material selected from a group consisting of: rubber, silicon glue and plastic.

12. The color wheel assembly as claimed in the claim 1, wherein the carrier defines a balancing groove therein.

* * * * *